United States Patent
Sill et al.

(10) Patent No.: US 8,577,641 B2
(45) Date of Patent: Nov. 5, 2013

(54) METHOD FOR CALIBRATION OF DYNAMIC MOTION SENSORS

(75) Inventors: Robert D Sill, Laguna Hills, CA (US);
Mark I Schiefer, Loveland, OH (US);
Joshua B Moses, Cincinnati, OH (US)

(73) Assignee: The Modal Shop, Cincinnati, OH (US)

( * ) Notice: Subject to any disclaimer, the term of this patent is extended or adjusted under 35 U.S.C. 154(b) by 0 days.

(21) Appl. No.: 13/602,268

(22) Filed: Sep. 3, 2012

(65) Prior Publication Data

US 2013/0013241 A1    Jan. 10, 2013

Related U.S. Application Data

(63) Continuation of application No. 12/313,486, filed on Nov. 20, 2008, now Pat. No. 8,280,666.

(60) Provisional application No. 61/008,839, filed on Dec. 21, 2007.

(51) Int. Cl.
*G01D 18/00*    (2006.01)
*G01C 25/00*    (2006.01)

(52) U.S. Cl.
USPC ........... 702/104; 702/105; 702/121; 702/182; 702/189

(58) Field of Classification Search
USPC .................. 702/104–107, 116–124, 182–185
See application file for complete search history.

(56) References Cited

U.S. PATENT DOCUMENTS

| | | | |
|---|---|---|---|
| 3,830,091 A | 8/1974 | Sinsky | |
| 4,495,433 A | 1/1985 | Sheridan | |
| 4,739,661 A | 4/1988 | Bucholtz et al. | |
| 4,800,267 A | 1/1989 | Freal et al. | |
| 5,321,638 A | 6/1994 | Witney | |
| 5,435,168 A | 7/1995 | Granere | |
| 5,717,488 A | 2/1998 | Watanabe | |
| 5,804,697 A | 9/1998 | Banaszak | |
| 5,895,858 A * | 4/1999 | Malone et al. | 73/1.38 |
| 6,198,788 B1 | 3/2001 | Calamatas | |
| 6,295,507 B1 | 9/2001 | Sasamoto et al. | |

(Continued)

FOREIGN PATENT DOCUMENTS

EP    1630562 A1    3/2006

OTHER PUBLICATIONS

ISO 16063-11, Methods for the calibration of vibration and shock transducers—Part 11: Primary Vibration Calibration by Laser Interferometry, ISO 1999.*

(Continued)

*Primary Examiner* — Phuong Huynh
(74) *Attorney, Agent, or Firm* — Phillips Lytle LLP

(57) ABSTRACT

An improved method for calibration of dynamic motion sensors. In one aspect, the method comprises sending a low frequency driving signal to an exciter to generate a harmonic movement in a shaker table, using an optical position sensor to produce an output representative of position, computing the acceleration of the shaker table and a dynamic motion sensor under test (SUT), and comparing the output of the SUT with the instantaneous acceleration of the shaker table at different frequencies sufficient to define the performance characteristics of the SUT within a selected frequency range, among other things. In another aspect, the method comprises calibration of a dynamic motion SUT by simultaneous direct measurement of position and time. In another aspect, the optical position sensor has an electrical output representative of position for attaining a desired degree of positional accuracy.

7 Claims, 8 Drawing Sheets

(56) References Cited

U.S. PATENT DOCUMENTS

| | | |
|---|---|---|
| 6,640,609 B1 | 11/2003 | Nadkarni et al. |
| 6,823,279 B1 | 11/2004 | Nadkarni et al. |
| 6,886,404 B2 | 5/2005 | Digonnet et al. |
| 7,091,715 B2 | 8/2006 | Nemirovsky et al. |
| 7,162,911 B2 | 1/2007 | Hattori |
| 7,165,440 B2 | 1/2007 | Umeda |
| 2003/0146867 A1 | 8/2003 | Kornle et al. |
| 2004/0011948 A1 | 1/2004 | Tobiason |
| 2005/0007598 A1* | 1/2005 | Ishizuka .................. 356/499 |
| 2006/0187743 A1 | 8/2006 | Carreras |

OTHER PUBLICATIONS

Umeda a et al, "Calibration of a three-axis accelerometer as a three-dimensional accelerometer using laser interferometers and a three-dimensional vibration generator," Journal of the Japan Society of Mechanical Engineers, Japan Society of Mechanical Engineers, Tokyo, JP, Jun. 4, 2003, pp. 67-70 (XP-002983552).

European Patent Office, Communication (Notice of intent to grant a European Patent), Application No. 08 020211.2, Jul. 4, 2011.
European Patent Office, Communication (European search report), Application No. 08 020 211.2, May 3, 2010.
Renishaw, apply innovation, non-contact position encoders, product brochure, Renishaw plc, copyr. 2005-2007.
RG2, http://www.renishaw.com/en/6441.aspx, accessed: Oct. 18, 2007.
RGH24 encoder system, http://www.renishaw.com/en/6444.aspx, accessed: Oct. 18, 2007.
Voice coil, Wikipedia, http://en.wikipedia.org/wiki/Voice_coil, accessed: Oct. 18, 2007.
ISO16063-21, Methods for Calibration of Vibration and Shock Transducers—Part 21: Vibration Calibration by Comparison to a Reference Transducer, copyr. ISO 2003.
ISO16063-11, Methods for Calibration of Vibration and Shock Transducers—Part 11: Primary Vibration Calibration by Laser Interferometry, copyr. ISO 1999.
European Patent Office, Communication (extended European search report), Application No. EP 11 19 6157.9, Feb. 16, 2012.

* cited by examiner

Prior Art

METHOD FOR CALIBRATION OF DYNAMIC MOTION SENSORS

CROSS-REFERENCE TO RELATED APPLICATIONS

The present application is a continuation of co-pending U.S. patent application Ser. No. 12/313,486, filed Nov. 20, 2008, which claims the benefit of U.S. Provisional Application No. 61/008,839, filed Nov. 20, 2007, incorporated herein by reference.

FIELD OF THE INVENTION

The invention relates generally to methods and systems for accurate calibration of dynamic motion sensors. A dynamic motion sensor ("motion sensor" or "sensor") is defined as any transducer measuring time varying displacement and/or acceleration including but not limited to accelerometers, velocimeters and displacement probes.

BACKGROUND OF THE INVENTION

In one aspect, dynamic motion sensors are transducers used for measuring acceleration. Single axis or uni-axial dynamic motion sensors are generally sensitive along a single axis. For example, acceleration magnitude may be measured by means of an external instrument or measuring system sensing the electrical output of the accelerometer. The accelerometer output may be a voltage waveform proportional to the magnitude of the applied acceleration. Similarly, dynamic motion sensing devices such as velocimeters and dynamically responding displacement transducers may output a voltage waveform or generate current proportional to velocity.

A dynamic motion sensor to be tested is referred to herein as a Sensor Under Test or "SUT" and a high accuracy reference sensor is referred to as "REF." ISO16063-21 is an ISO standard entitled *Vibration Calibration by Comparison to a Reference Transducer.*

SUT and REF devices may be attached to a device capable of imparting harmonic motion at significant displacement. One such device is depicted in FIG. 1 and is referred to as a long-stroke shaker or long-stroke vibrator. During the calibration, the reference transducer is used to measure the applied acceleration. Both accelerometers output a time-varying electrical signal proportional to the magnitude of the acceleration to which the device is subjected. This time varying electrical signal may take the form of a voltage proportional to the magnitude, but it may also be in the form of a current, or charge proportional to the magnitude of acceleration.

BRIEF SUMMARY OF THE INVENTION

In one aspect, the present invention comprises a dynamic motion sensor calibration system that includes a long-stroke shaker table or other low frequency mechanical or electromechanical exciter ("exciter"), an optical displacement sensor or encoder, wherein the optical displacement sensor is a reference sensor, a microprocessor unit, and at least one analog to digital converters (ADCs) included in the microprocessor, and wherein the microprocessor unit generates a sinusoidal signal to the exciter to generate harmonic movement of the exciter and additionally wherein the optical displacement sensor outputs a first analog displacement signal to the at least one ADCs for conversion to a first digital signal. In alternate embodiments, the calibration system may have two, three, or more ADCs.

In one aspect, the present invention comprises a method for calibration of a dynamic motion sensor under test (SUT) by simultaneous direct measurement of position and time, comprising one or more of the following:

a—sending a low frequency electrical driving signal having an adjustable amplitude from an electrical source to an exciter to generate a harmonic movement in an associated shaker table;

b—mounting a SUT on said shaker table such that the primary sensing axis of said SUT is generally parallel to the axis of motion of said shaker table;

c—providing a non-contact optical position sensor having an electrical output representative of position for attaining a desired degree of positional accuracy;

d—reading said electrical output as the reference for position as a function of time;

e—mathematically computing the instantaneous acceleration of said shaker table and said SUT as the second time derivative of said electrical output as a function of time;

f—reading the electrical output of said SUT as a function of time;

g—comparing at an identifiable time said electrical output of said SUT with said computed instantaneous acceleration;

h—comparing said electrical output of said SUT with said instantaneous acceleration at a plurality of frequencies sufficient to define the performance characteristics of said SUT within a selected frequency range.

In another aspect, the invention comprises a method for calibrating a dynamic motion sensor comprising:

a—sending a continuous sinusoidal wave having a predetermined low level frequency from a microprocessor to a long-stroke shaker table or other low frequency mechanical or electromechanical exciter to generate a harmonic movement in the table;

b—transmitting sinusoidal photocurrent outputs from an optical displacement encoder positioned on the shaker table to a first analog-to-digital converter card (ADC) in the microprocessor;

c—directing an output signal from a test dynamic motion sensor to a second ADC card wherein the second ADC is functionally attached to the first ADC;

d—converting the photocurrent outputs to a displacement signal;

e—transforming the displacement signal into a magnitude and phase measurement at the predetermined frequency using Fourier transform methods;

f—measuring magnitude and phase of the test sensor output signal at the predetermined frequency using Fourier transform methods;

g—storing the magnitude and phase measurements of the optical displacement encoder and the sensor;

h—calculating the sensitivity of the test dynamic motion sensor;

i—repeating steps a through h at a different determined low level frequency.

In alternate embodiments, the calibration method may utilize one, three, or more ADCs.

These and other aspects, features, objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF PREFERRED EMBODIMENTS OF THE INVENTION

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

The invention provides a solution that can very accurately calibrate a dynamic motion sensor at low frequencies. Low frequencies are defined as 10 Hz and lower. The dynamic motion sensor under test is placed on an electrical or electromechanical exciter with the axis of sensitivity oriented parallel to the stroke axis of the shaker. One form of such an exciter is a long stroke shaker. The output signal is connected to a computer system through appropriate signal conditioning and digitized by an analog to digital converter card for digital signal analysis.

Figure 1:
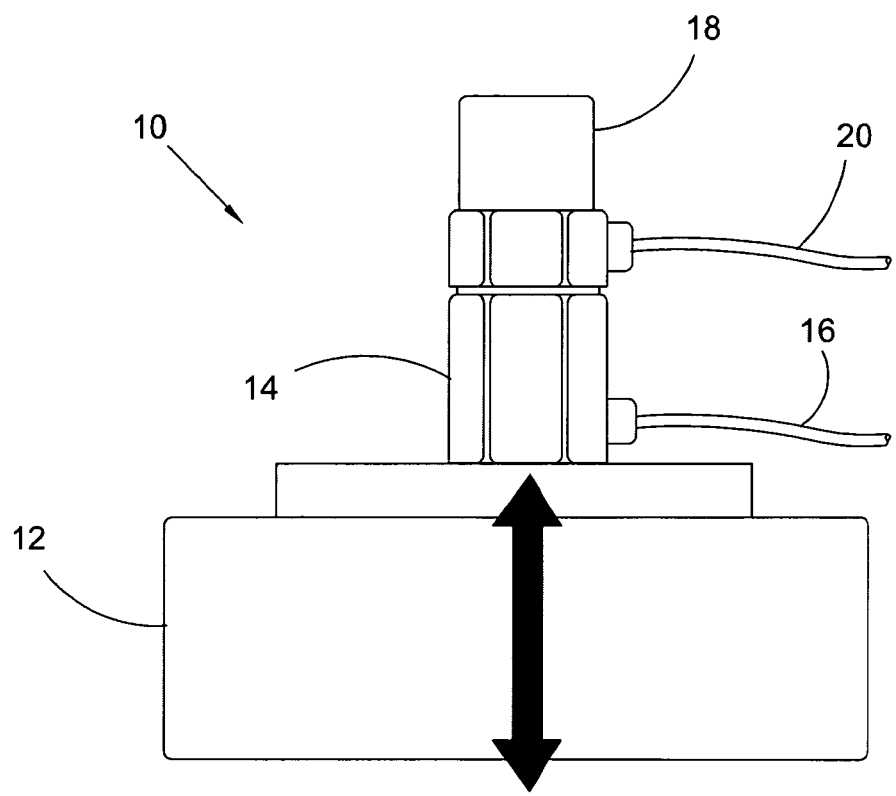
FIG. 1 is an idealized front view of a prior art dynamic motion sensor calibration system.

Adverting to the drawings, FIG. 1 is a schematic front view of a prior art "back-to-back" dynamic motion sensor calibration system 10 ("system 10"). Shaker 12 is seen supporting reference sensor 14 from which cord 16 extends to computer 50 (not seen in FIG. 1). In the embodiment shown, test dynamic motion sensor 18 is stacked on top of reference dynamic motion sensor 14 (back-to-back). Cord 20 extends from test dynamic motion sensor 18 to computer 50. Voltage signals, current signals, or other appropriate signals generated in dynamic motion sensors 14 and 18 are transmitted to computer 50 during the calibration process. The arrow in FIG. 1 indicates the direction of the harmonic movement of the stacked dynamic motion sensors as shaker 12 is operated. The stacked configuration enables both test dynamic motion sensor 18 and reference dynamic motion sensor 14 to travel the same distance along the same axis of sensitivity during the calibration procedure.

Figure 2:
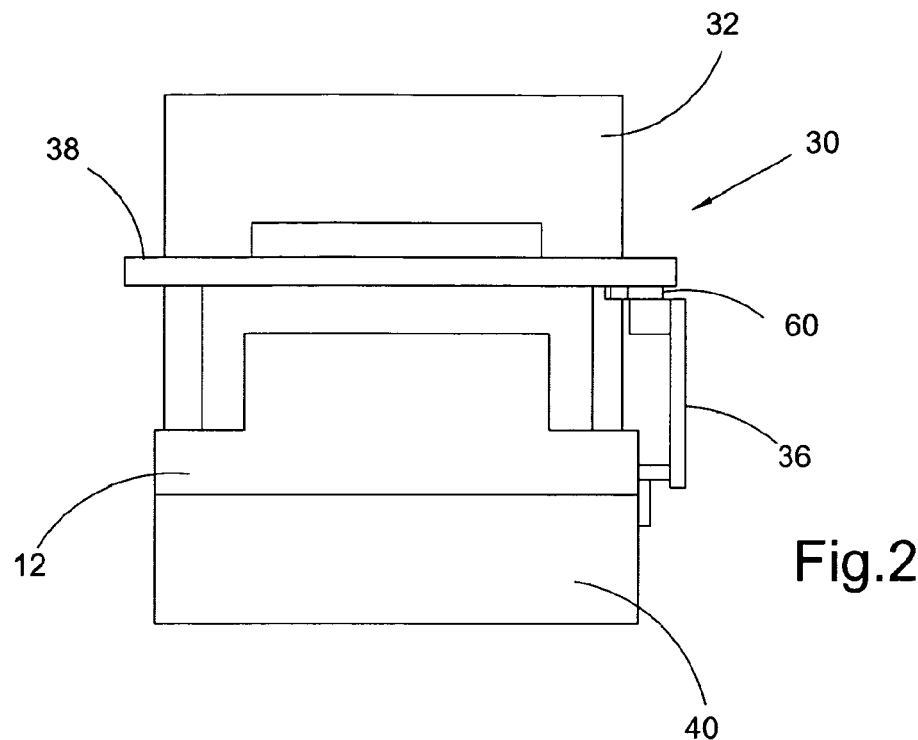
FIG. 2 is a front view of the exciter component of the dynamic motion sensor calibration system of the present invention.

FIG. 2 is a front view of calibration system 30. Shaker 12 is supported by base 40 which in turn supports table 38. Shaker 12 is a type of electrical or electromechanical exciter used to generate a sinusoidal motion during calibration of a test sensor. Motor housing 32 is also seen covering the motor that moves shaker 12. Shaker 12 itself is constructed as a voice-coil type device with the armature and dynamic motion sensor support table 38 riding on air bearings for smooth motion with a minimum of transverse motion. The particular construction of the shaker, table, and bearing system is not particularly critical to the nature of this invention description. A suitable long stroke shaker may be a commercially available device such as the APS ELECTRO-SEIS series or it may be a custom designed device. FIG. 2 specifically depicts the APS ELECTRO-SEIS Model 129 from APS Dynamics, Inc., Carlsbad, Calif. with optical encoder detector unit 60 ("encoder 60"), which is described below, attached to table 38. Tape scale 62 (not shown) utilized with optical encoder detector unit 60 is attached to the underside of the moving shaker table 38. Thus, tape scale 62 undergoes the same motion as the test dynamic motion sensor 18, which is attached to the top side of moving shaker table 38.

Figure 3:
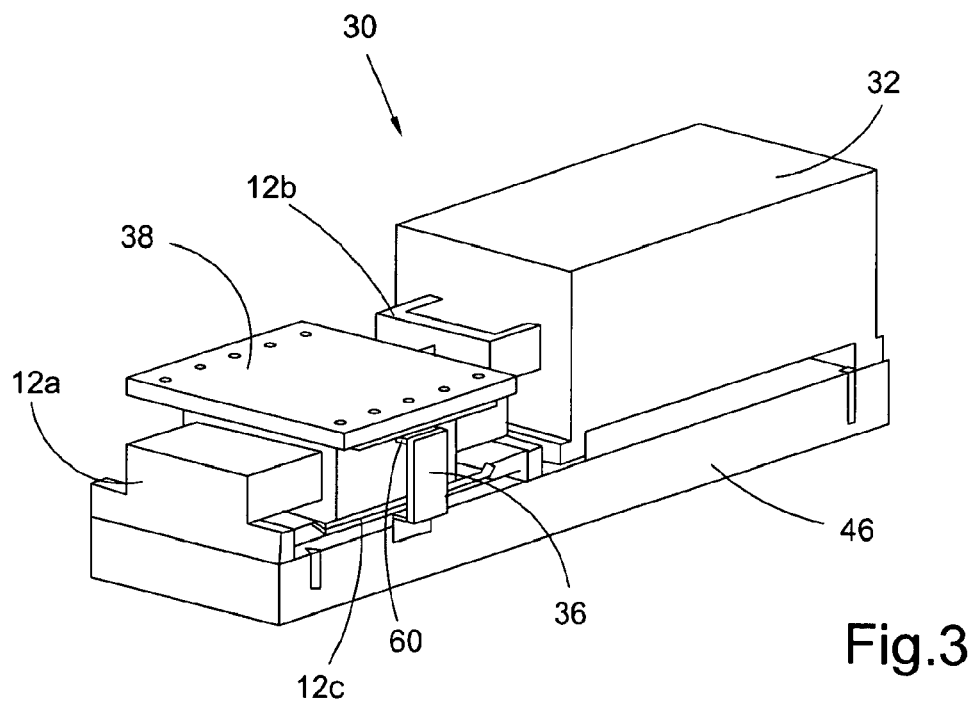
FIG. 3 is a top perspective view showing the various components of the exciter that act in concert to move the table vertically in a harmonic movement.
Figure 3A:
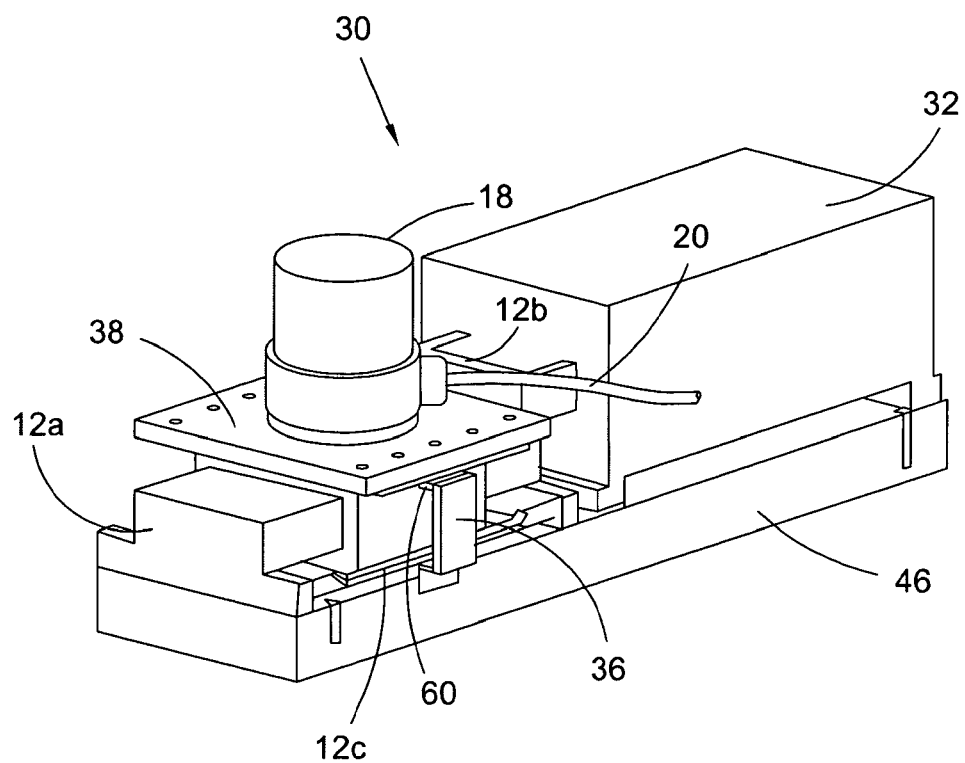
FIG. 3A is a top perspective view of the dynamic motion sensor calibration system of the present invention with a test dynamic motion sensor on the table of the exciter.

FIG. 3 is a top perspective view of shaker 12 showing the various components 12a, 12b, and 12c that act in concert to enable table 38 to move vertically in a harmonic movement. FIG. 3A is a top perspective view of the calibration system 30 of the present invention. Test dynamic motion sensor 18 ("Sensor Under Test 18" or SUT 18") is seen supported by table 38. Similar to prior art system 10, cord 20 is seen extending to microprocessor 50 not shown in FIG. 3A. In place of reference dynamic motion sensor 14, encoder 60 is used as a reference standard to calibrate test dynamic motion sensor 18. Bracket 36 holds encoder 60 in place under table 38.

Figure 6:
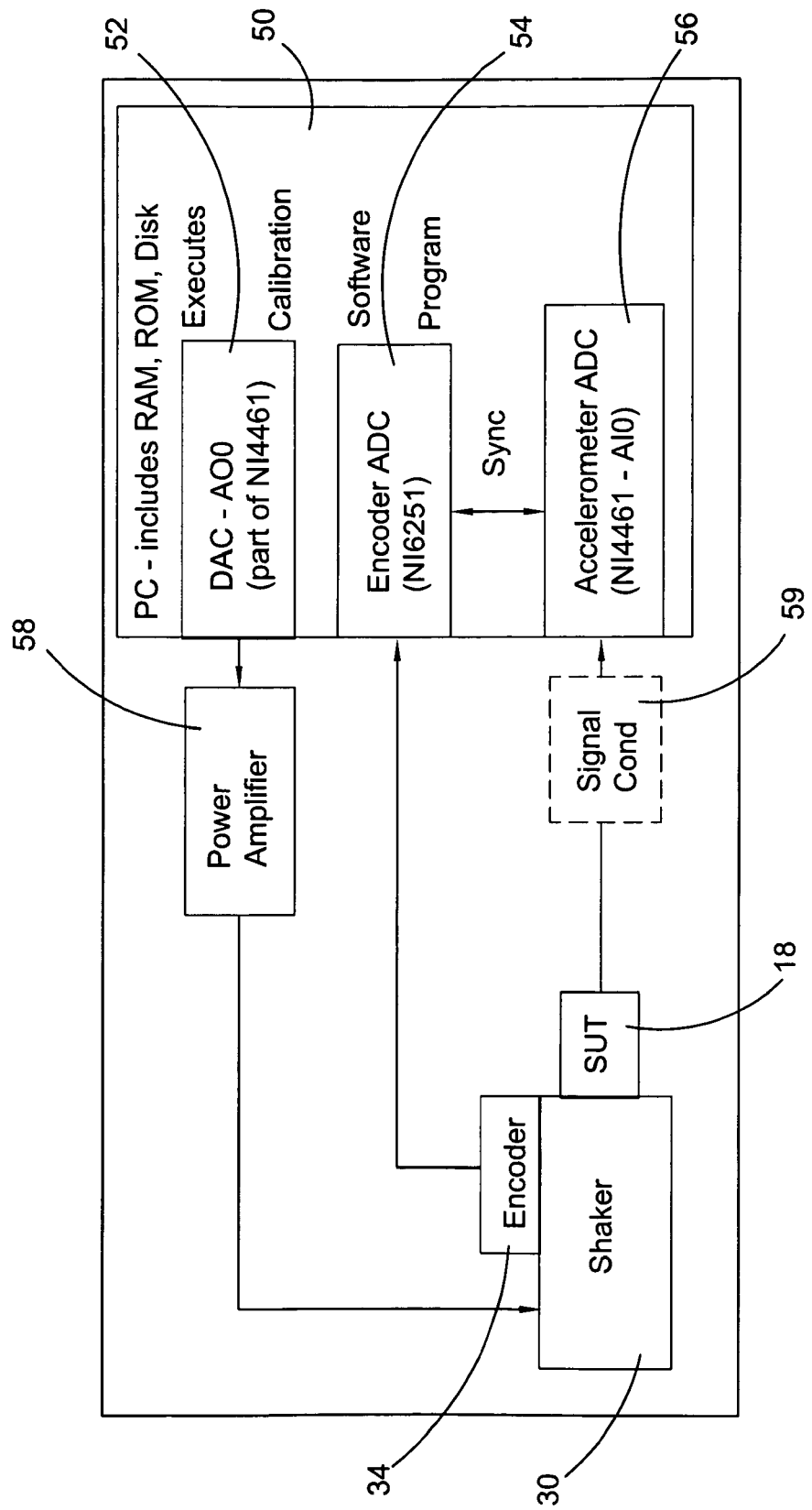
FIG. 6 is a schematic diagram of the links between the computer and the calibration system of the present invention.

Utilizing an open non-contacting optical linear encoder system 60 with shaker 12 eliminates friction and wear and permits high speed, high resolution displacement measurement at low frequency during the calibration operation. Encoder 60 utilizes 20 μm or better pitch optics on scale 62 enabling linear resolution of 10 nm or better with appropriate signal processing. As seen in FIG. 6, the output of encoder 60 is connected to a medium resolution analog-to-digital converter card 54 ("ADC 54") for digitizing and subsequent decoding of the position information that is encoded in the form of an analog sinusoidal signal. As explained below, the encoded analog output signal of optical encoder 60 has a period of 20 μm which is independent of the frequency and amplitude of vibration of shaker 12.

Figure 4:
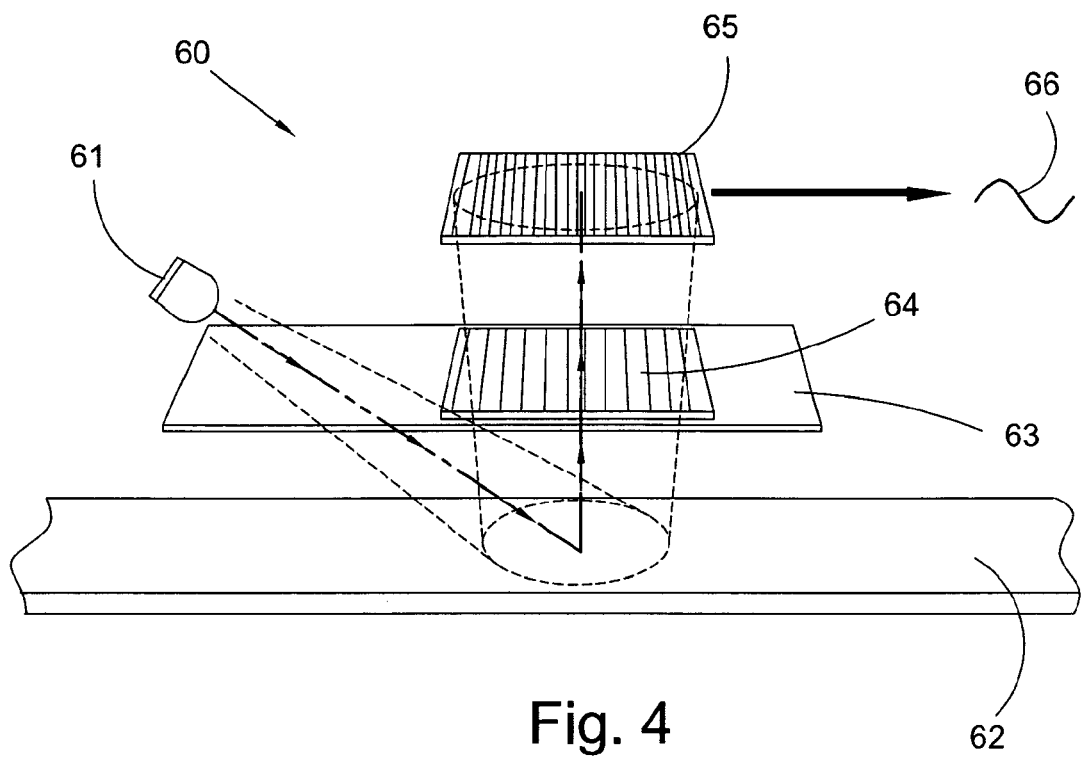
FIG. 4 is an idealized diagram of the position encoding subsystem of the present invention.
Figure 5:
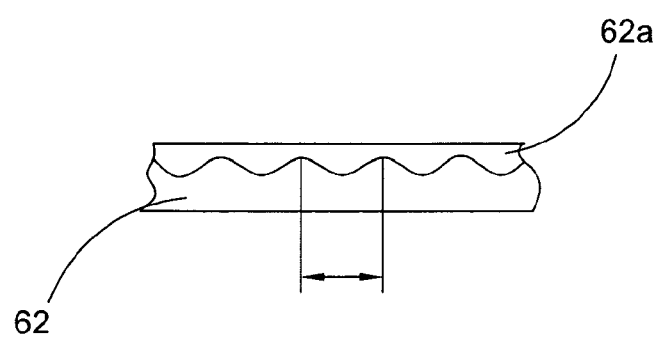
FIG. 5 is a cross section view of the scale of the position encoding subsystem of FIG. 4 showing the upper lacquer scale coating and a 20 μm pitch facet on the upper surface of the scale.

FIG. 4 is an idealized diagram of encoder 60. Encoder system 60 includes a scale 62 that is essentially a reflective metal plane with 20 μm period facets. Scale 62 can be a tape scale taped to table 38 in position for grating 64 to receive light reflected from scale 62. As table 38 moves, the displacement of attached scale 62 is observed. Light from light source 61, preferably an LED, is directed to scale 62. The light reflects from scale 62 through index grating 64 on readhead window 63. Photodetector 65 senses the light and outputs sinusoidal photocurrents 66 which are in quadrature (one with 90 degree phase shift with respect to the other). The transmissive phase grating 64 produces an image or view of the moving scale 62, which includes a 20 μm pitch scale, with non-periodic features filtered out. The nominally square-wave scale pattern is also filtered to leave a pure sinusoidal fringe field at the detector. Preferably, this allows displacement measurement to an error of less than ±0.15 μm. In a preferred embodiment, scale 62 is gold plated. More preferably, scale 62 includes lacquer coating 62a to allow for handling protection and maintenance of scale 62. FIG. 5 is a cross section view of scale 62 showing lacquer scale coating 62a that receives the light from light source 61. Preferably, the distance between the peaks of scale 62 is 20 μm as indicated by the double headed arrow. Such an optical displacement encoder provides the unexpected advantage of allowing for more accurate measurement of the displacement of the reference standard at low frequencies than would be obtainable from a second precalibrated accelerometer acting as the reference for test accelerometer 18. A suitable encoder 60 is the RGH24 noncontact encoder system from Renishaw, Hoffman Estates, Ill. 60192.

The sinusoidal quadrature output of positional encoder 60 is synchronously sampled by the medium resolution ADC 54 with the high resolution dynamic motion sensor ADC card 56 ("ADC 56"). The samples are buffered in the memory of the microprocessor 50 for later processing into displacement and equivalent relevant motion, such as velocity or acceleration information, using buffer memory units well known to those of skill in the art. Because sinusoidal outputs 66 are in quadrature, the direction of motion can be determined by the phase of the outputs as detected, and the distance is determined by the recorded displacement along the spatial period, the line spacing of grating 64 in the encoder 60.

The digitization of both the test dynamic motion sensor 18 output and the encoder 60 output are triggered and synchronized using encoder ADC 54 (NI6251) and a dynamic motion sensor ADC card, for example accelerometer ADC 56 (NI4461)—two analog to digital converter cards—that are installed and functionally connected to each other within computer 50. By functionally connected is meant that the link between the ADCs 54 and 56 allows for the exchange of information, including digitized displacement data between the two cards. The link may be directly between the two cards, may include one or more intervening components, or may be a wireless link that allows for data exchange. This synchronization is critical to the correct operation of calibration system 30 and is performed using the functional connection 58 between ADC 54 and ADC 56 which act as two data acquisition boards.

FIG. 6 is a schematic diagram of the links between microprocessor or computer 50 and calibration system 30. A sinusoidal drive signal having a predetermined frequency is provided by the computer or microprocessor 50 from digital-analog converter card 52 ("DAC 52") through amplifier 58 to drive shaker 12 and attached motion sensor 18 ("SUT 18") in simple harmonic motion at each frequency of calibration. Amplifier 58 is sometimes necessary to provide sufficient power to actuate the linear voice coil based electro dynamic shaker 12. The drive signal amplitude is adjusted at different frequencies, thereby adjusting the magnitude of movement imparted to the dynamic motion sensor 18 (SUT 18) to be calibrated. Feedback from optical encoder system 60 is utilized in order to control the drive signal amplitude adjustment. Included in microprocessor 50 are the necessary RAM, ROM, disk, display, keyboard, mouse, and other necessary inputs so as to facilitate running the calibration program and the human interaction with the calibration process which are known to those having skill in the art.

Figure 7:
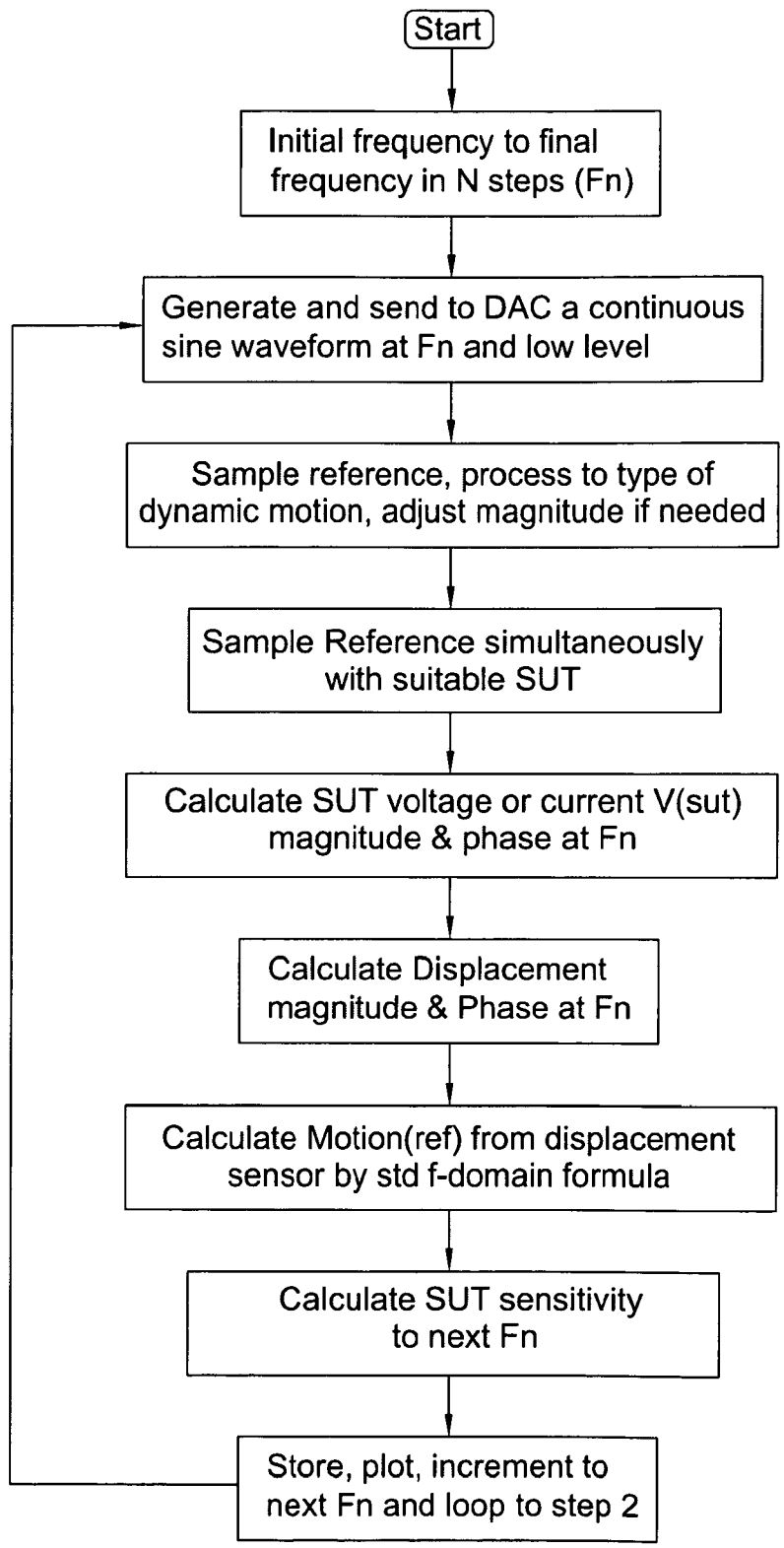

FIG. 7 is a flow diagram of the method of calibrating SUT 18 embodied in the processing software that is contained within computer 50. FIG. 7 depicts the method that is responsible for measurement of the magnitude and phase of the motion sensor output voltage signal from SUT 18 by means of the Discrete Fourier Transform (DFT) or Fast Fourier Transform (FFT) methods which are well known to those having skill in the art. The processing software is further responsible for conversion of the optical encoder signal to a displacement signal. The displacement signal is then transformed into a magnitude and phase calculation by means of a DFT method as well. The displacement signal is converted into an equivalent acceleration magnitude and phase by means of the well-known physical relationship of ($g=0.511 \times f^2 \times D$) (English).

SUT 18 is subjected to simple harmonic (sinusoidal) motion of a constant amplitude and frequency during the measurement time of each frequency in the calibration interval. This harmonic motion is generated in electrical or electromechanical exciter 12 by means of a software signal generator which is responsible for generating a continuous sinusoidal waveform of appropriate amplitude and frequency for the target calibration point. This sinusoidal waveform is generated by the calibration program of microprocessor 50 from DAC 52 and applied to the power amplifier 58 input connection. Power amplifier 58 is a common power amplifier, capable of driving the voice coil based shaker 12 in response to an input signal presented to the input terminals of amplifier 58. The process of driving a shaker of this type in simple harmonic motion is well known in the industry, and thus will not be addressed any further.

SUT 18 to be calibrated is firmly mounted to exciter 30 so that the axis of sensitivity of SUT 18 is parallel to the axis of motion of exciter 30. SUT 18 is connected to ADC 56 in microprocessor 50 either directly or through signal conditioning module 59, whereby the signal conditioning required is a function of the type of output signal of the particular SUT 18 being calibrated. Signal conditioning module 59 shown is optional and may be required if the output of motion sensor 18 under test is not voltage that is proportional to the appropriate dynamic motion, for example acceleration or velocity, but is rather current or charge proportional. In this case, signal conditioning module 59 may be a differential amplifier or charge amplifier functioning as a buffer device for the dynamic motion signal into ADC 56. Such signal conditioners are well known to those having skill in the art. The particular signal conditioning being performed is not the subject matter of this patent, is well known in the art, and thus will not be addressed in any further.

SUT 18 outputs an analog displacement signal to a high resolution ADC 56 (N14461) which contains integral anti-alias low pass filters, gain, internal clocking, and triggering capability. This card is also capable of synchronizing both the acquisition of blocks of data and sampling processes of the ADC 54 (N16251). This synchronized sampling is an integral and important part of the calibration process, whereby samples of SUT 18 output and positional information from encoder 60 must be obtained and processed simultaneously or nearly simultaneously in time in order to be compared.

The buffered samples of quadrature position information generated from optical encoder 60 are first processed from encoded quadrature information into absolute positional information by the simple formula of X (position)=arctan 2 (cos/sin) ("arctan"). Thus, after processing, the result is a buffer of position information which was sampled at the same time the dynamic motion sensor output waveform was sampled.

The buffered position information waveform is then transformed into the frequency domain by means of a Fourier transform. The resultant magnitude and phase components are converted to measured units of movement by means of simple formulas. For example, acceleration is converted using the formulas acceleration in inches/second-squared=$0.0511 Df^2$, English, where D=inches pk-pk, or acceleration in meters/second-squared=$2.013 Df^2$, Metric, where D=meters pk-pk. The sensitivity of the motion sensor being calibrated is then calculated in units of output per unit of motion, such as, for example, acceleration or velocity, at each calibration frequency by taking the simple ratio of Accelerometer Output/Acceleration ($S_{sut}=S_{ref}/V_{sut}$). The sampling process, and the specific spectral component of the Fourier transform utilized is selected to be the same as is generated by the signal generation subsystem of the motion sensor calibration subsystem. Similarly, the output signal from dynamic motion sensor 18 is transformed into the magnitude and phase component of a displacement signal and converted into units of motion, such as velocity or acceleration. The magnitude and phase measurements of optical displacement encoder 60 and SUT 18 for a particular frequency are stored and the process is repeated for a different predetermined frequency.

Optical position encoder device 60 is connected to the medium resolution ADC 54 (NI 6251) which contains gain, internal clocking and triggering capability, and is capable of being synchronized to other ADC subsystems such as the accelerometer ADC 56 (NI4461). The sample rate of position encoder ADC 54 is chosen to be a fixed higher ratio multiple of the sample rate of accelerometer ADC 56. The sample rate of the position encoder card must be chosen sufficiently high so as to digitize the encoded positional information being emitted from optical position encoder 60.

Figure 6A:
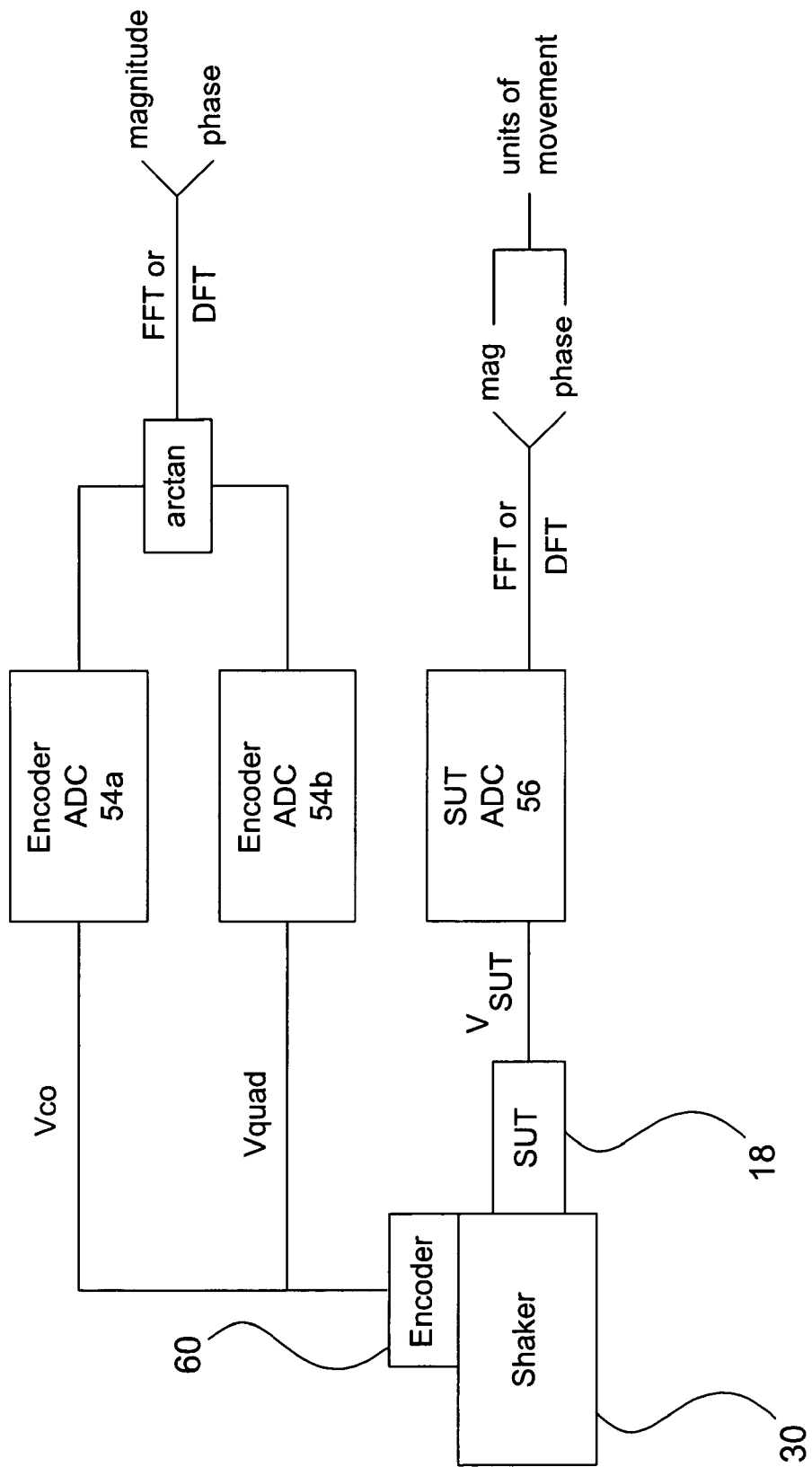
FIG. 6A is a schematic diagram of an alternate embodiment of the circuit generating the calibration measurements of a dynamic motion sensor.
Figure 6B:
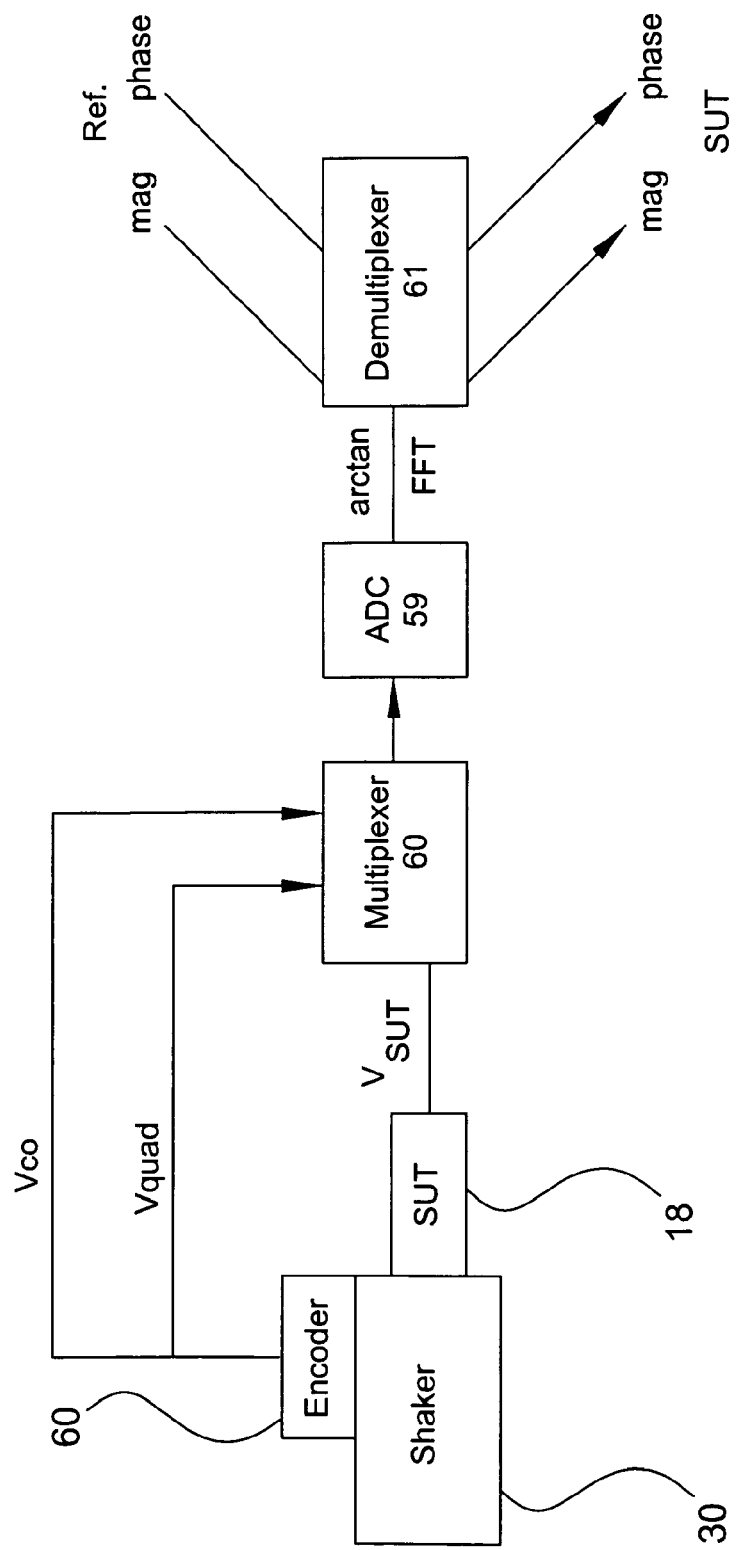
FIG. 6B is a schematic diagram of a second alternate embodiment of the circuit generating the calibration measurements of a dynamic motion sensor; and, FIG. 7 is a flow diagram depicting the general method of calibrating a dynamic motion sensor of the present invention.

FIGS. 6A and 6B depict two alternate embodiments of system 10 in which different numbers of ADCs are used to calibrate an SUT. Because sinusoidal motion in the exciter 12 is generated as described above, that portion of the calibration circuit is omitted. In FIG. 6A, the quadrature signal produces proportional voltage signals $V_{co}$, and $V_{quad}$ that are received by ADC 54a and 54b, respectively. Together, ADCs 54a and 54b perform the calculations to obtain the buffered positional information from which they determine the appropriate units of motion using DFT or FFT. The signal $V_{SUT}$ from SUT 18 is transmitted to ADC 56 and processed as discussed above.

FIG. 6B depicts an embodiment in which one ADC 59 is used to process the signals $V_{co}$ and $V_{quad}$ from encoder 60 and $V_{SUT}$ from SUT 18. Multiplexer 60 combines the separate signals into one signal and transmits it to ADC 59 where the calculations described above are executed. Demultiplexer 61 separates the encoder 60 and SUT 18 signals to store the magnitude and phase measurements of encoder 60 and SUT 18 and the process is repeated for a different frequency. It will be recognized that these processing and storage functions may be combined into different types of ADCs to obtain the same measurements.

The quadrature outputs are typically 1 volt peak to peak signal levels, of a differential nature. The calibration software examines the amplitude of these raw quadrature signals and makes a determination as to the health of the optical subsystem, the optical tape scale surface, and general alignment conditions of the subsystem by examination of the amplitude and purity of the encoded quadrature signal. The determination of health of the reference itself is not something new and unique to the position measurement industry, or technology itself. The determination of health of the reference sensor itself is however something new and unique to the dynamic motion sensor calibration industry and thus the subject of one of the claims of the invention.

Thus it is seen that the objects of the invention are efficiently obtained, although changes and modifications to the invention should be readily apparent to those having ordinary skill in the art, which changes would not depart from the spirit and scope of the invention as claimed.

What is claimed is:

1. A method for calibration of a dynamic motion sensor under test (SUT) by simultaneous direct measurement of position and time, comprising:
    sending by a computer a low frequency electrical driving signal having an adjustable amplitude from an electrical source to an exciter, thereby generating a harmonic movement in an associated shaker table;
    mounting said SUT on said shaker table such that the primary sensing axis of said SUT is generally parallel to the axis of motion of said shaker table;
    adjusting said electrical driving signal amplitude using said computer, thereby adjusting the magnitude of movement imparted to said SUT;
    using a non-contact optical position sensor to produces an electrical optical position sensor output representative of position for attaining a desired degree of positional accuracy;
    reading said electrical optical position sensor output as the reference for position as a function of time using said computer;
    mathematically computing the instantaneous acceleration of said shaker table and said SUT as the second time derivative of said electrical optical position sensor output as a function of time using said computer;
    reading said electrical optical position sensor output of said SUT as a function of time using said computer;
    comparing at an identifiable time said electrical optical position sensor output of said SUT with said computed instantaneous acceleration using said computer; and
    comparing said electrical optical position sensor output of said SUT with said instantaneous acceleration at a plurality of frequencies sufficient to define the performance characteristics of said SUT within a selected frequency range using said computer.

2. The method as recited in claim 1, further comprising: mathematically computing the instantaneous velocity of said shaker table as the first time derivative of said electrical optical position sensor output as a function of time using said computer; comparing at an identifiable time said electrical optical position sensor output of said SUT with said instantaneous velocity using said computer; and comparing said electrical optical position sensor output of said SUT with said instantaneous velocity at a plurality of frequencies sufficient to define the performance characteristics of said SUT within a selected frequency range using said computer.

3. The method as recited in claim 1 wherein said non-contact optical position sensor has a precalibrated grating.

4. The method as recited in claim 1 wherein said non-contact optical position sensor is configured and arranged such that a coherent, collimated and monochromatic light source is not required.

5. The method as recited in claim 1 wherein said electrical driving signal is continuous sinusoidal.

6. The method as recited in claim 1 wherein said electrical driving signal is digital.

7. The method as recited in claim 1, further comprising: providing a plurality of measured attributes comprising a behavioral record of said SUT over its intended frequency and magnitude ranges when said exciter is driven over a plurality of low frequencies and stroke lengths using said computer.

* * * * *